No. 771,111. PATENTED SEPT. 27, 1904.
W. L. ABATE.
CHUCKING DEVICE.
APPLICATION FILED NOV. 2, 1903.
NO MODEL. 2 SHEETS—SHEET 2.
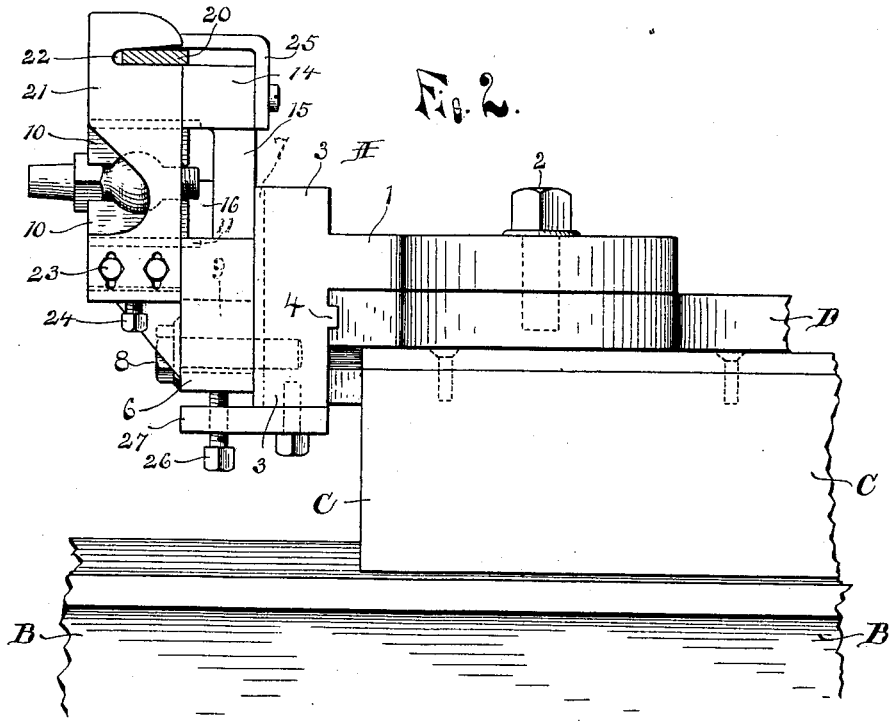
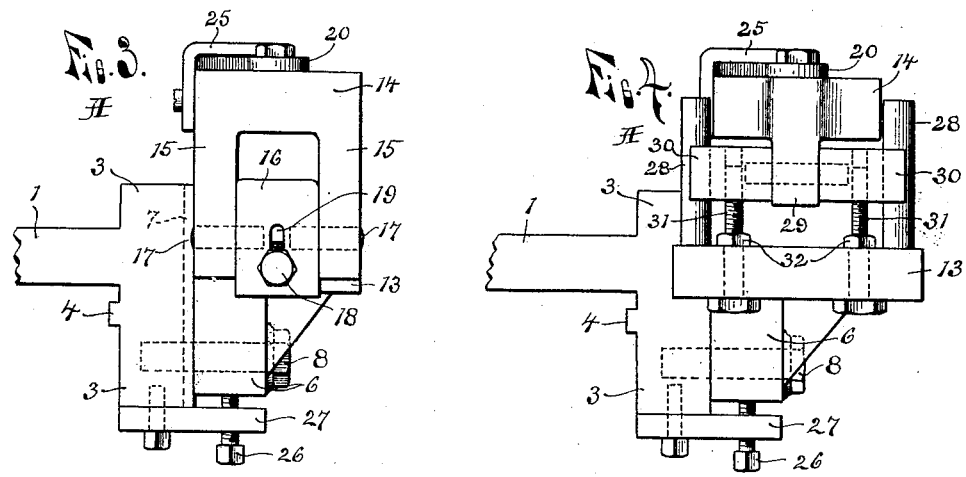
WITNESSES.
Lewis E. Flanders
Thomas D. Longstaff
INVENTOR.
Walter L. Abate
By
Attorneys.

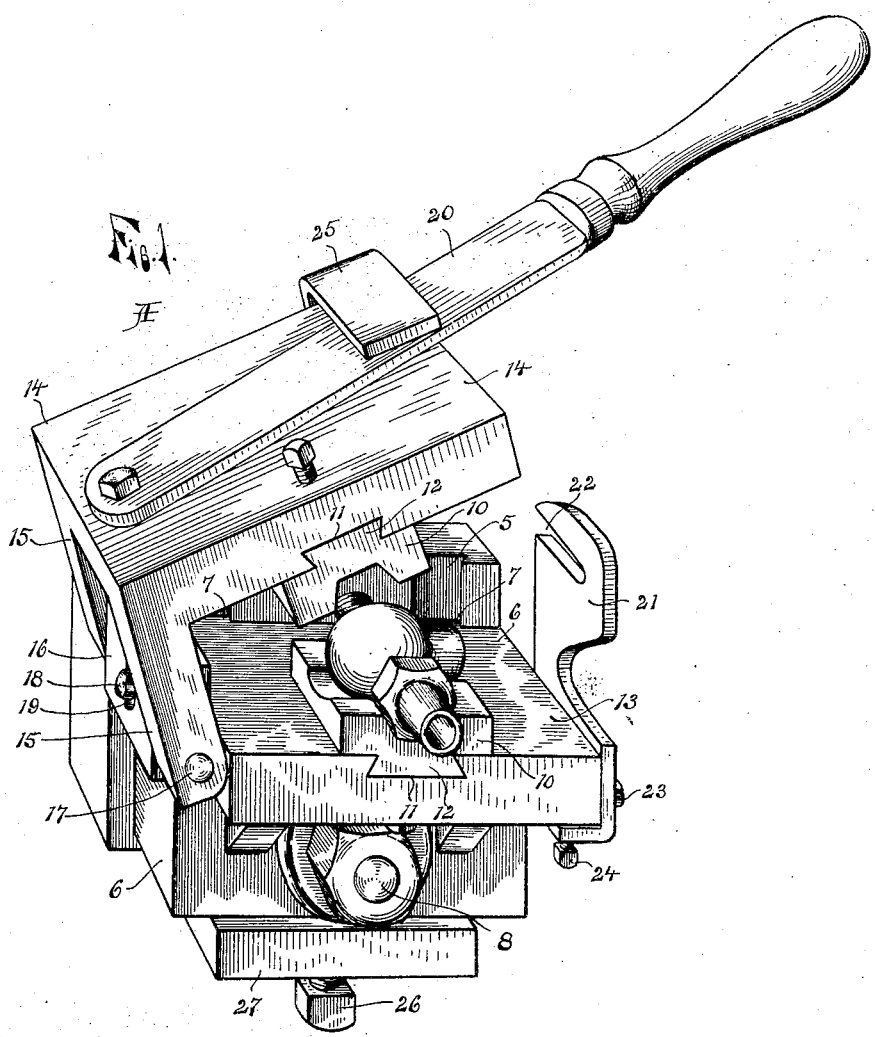

No. 771,111.

Patented September 27, 1904.

UNITED STATES PATENT OFFICE.

WALTER L. ABATE, OF DETROIT, MICHIGAN.

CHUCKING DEVICE.

SPECIFICATION forming part of Letters Patent No. 771,111, dated September 27, 1904.

Application filed November 2, 1903. Serial No. 179,458. (No model.)

*To all whom it may concern:*

Be it known that I, WALTER L. ABATE, a citizen of the United States of America, residing at Detroit, in the county of Wayne and State of Michigan, have invented certain new and useful Improvements in Chucking Devices, of which the following is a specification, reference being had therein to the accompanying drawings.

This invention relates to an improved work-holding device or chuck for lathes, and especially to a device for holding small articles of irregular form while being bored and finished.

The primary object of the invention is to facilitate the manufacture in large quantities of small cocks, valves, &c., by providing means which may be readily attached to the ordinary turret or other lathe and into which the articles to be finished may be quickly placed and will be centered and adjusted without the especial attention of the operator, the device being also arranged so that it may be quickly operated to release the articles when finished.

It is also an object of the invention to so construct the device that it may be readily changed to adapt it to articles of other sizes and shapes and to provide certain other new and useful features, all as hereinafter more fully described, reference being had to the accompanying drawings, in which—

Figure 1 is a perspective view of a device embodying the invention; Fig. 2, an elevation of the front side of the same; Fig. 3, an elevation of the rear side; and Fig. 4, an elevation of the rear side, showing a modified construction.

This chuck or holder A is for use upon the ordinary lathe, as shown in Fig. 2, B being the lathe-bed, upon which is mounted the longitudinally-movable saddle-block C, carrying the saddle D, all arranged and operated as in the ordinary and well-known turret-lathe.

The chuck A is carried by the saddle of the lathe by securing the base-plate 1 to the saddle by a screw-bolt 2, passing through a transverse slot in said plate into the saddle. The base-plate is provided with a head 3, which extends downward adjacent to the end of the saddle and is provided with a rib 4 to engage a transverse groove in the end of said saddle, so that the base-plate is secured firmly to the saddle, but may be adjusted laterally by loosening the bolt 2. Cut vertically in the outer face of the head 3 are the dovetail grooves 5, and on a bracket 6 are formed vertically-extending tongues 7 to engage said grooves, so that said bracket may be adjusted vertically upon said head, the bracket being held in the position to which it may be adjusted by a screw-bolt 8, passing through a slot 9 in the bracket into the head. To engage and clamp the article to be operated upon, two clamping blocks or jaws 10 are provided, each molded upon one face to fit the article, which is thus firmly held from moving in any direction when the jaws are closed together upon it, and the irregular outline of the article will prevent its being put between the jaws in any except the position in which the jaws were formed to receive it. On the back of each block or jaw 10 is formed a dovetail rib 11, and a dovetail groove 12 is formed in the upper face of the laterally-extending portion or table 13 of the bracket 6 to receive the rib on one block, and a similar groove is formed in the under face of a movable clamping member 14 to receive the rib of the other block, said blocks being adjustable in said grooves and held from moving therein by the set-screws. The clamping member 14 is pivotally secured at one end to one side of the table 13 by being provided with two downwardly-extending lugs 15, which embrace a block 16 and are pivotally secured thereto by pins 17, said block being adjustably secured to the edge of the bracket 6 and its table by a vertical dovetail connection and a bolt 18 extending through a vertical slot 19 in said block.

A flat bar 20, provided with a handle at one end, is pivotally secured at its opposite end to the upper face of the clamping member 14 to raise and lower said member, and a catch 21, adjustably secured to the edge of the table or stationary clamping member, is provided to engage said bar and hold the clamping member down to clamp the article while being operated upon. The catch 21 consists of a flat bar provided with a slot 22, cut inward from one edge to receive the bar 20, which is moved laterally to engage the same when the clamping member is lowered, and said catch is secured to the edge of the table by being provided with elongated openings to receive the bolts 23, which pass therethrough into the edge of the table. The lower end of the catch-bar is bent laterally beneath the table, and an adjusting-screw 24 extends through a screw-threaded opening in this bent end and engages the under side of the table to accurately adjust the catch vertically. The slot 22 is formed tapering, so that when the bar 20 is forced into the same the inclined side of said slot will engage the bar and draw the clamping member downward to more firmly clamp the article. A hook 25 is provided upon the clamping member to engage the handle-bar and hold the same against the upper face of the clamping member to take the strain off its pivot.

When another article than that for which the chuck is adjusted is to be operated upon, it is necessary to remove the clamping-blocks 10 and insert others molded to conform to the outlines of the article to be held. These blocks are then adjusted to bring the article in proper relation to the tools when the chuck is run forward and the chuck adjusted laterally on the saddle to bring the article in line with the tools. It may also be necessary to adjust the bracket 6 vertically by loosening the bolt 8 and turning the adjusting-screw 26, which extends through a screw-threaded opening in an extension 27 on the lower end of the head 3 into engagement with the lower end of the bracket. The block 16 may also be adjusted vertically, so that the clamping member will come down fairly upon the article to be clamped, as may also be the catch 21, so that it will properly hold the clamping member down.

In the modified construction shown in Fig. 4 the table 13 is extended laterally, and at each corner of one side of the table is erected a vertical post 28. The clamping member 14 instead of being provided with the downwardly-extending lugs 15 is provided with a lug 29, extending downward between the posts and provided with a transverse opening. Blocks 30 at each side of said lug partially embrace the posts and slide thereon, and a pin extends through the opening in the lug into said blocks to pivot the clamping member to said blocks. Adjusting-screws 31 extend through openings in the table and are held to turn therein by the nuts 32 in engagement with the upper side of the table and extend upward into screw-threaded openings in the blocks 30, so that by turning said screws the blocks are adjusted vertically on the posts and the clamping member quickly and accurately adjusted.

Having thus fully described my invention, what I claim is—

1. In a chuck for irregular forms, the combination of a stationary clamping member adapted to be vertically adjustably secured to the turret-head of a lathe, a movable clamping member pivotally mounted on the stationary member adapted to be moved toward and from the stationary member, clamping-blocks formed with faces molded to fit the article to be clamped and secured to the opposing faces of the clamping members, a handle pivoted on the upper face of the movable member and a catch-bar for said handle having a tapering slot secured to the stationary member.

2. In a chuck for irregular forms, the combination of a stationary clamping member adapted to be secured to a lathe, a block adjustably secured to one side of said member, a movable clamping member pivotally attached at one end to said block, clamping-blocks formed with faces molded to fit the article to be clamped and detachably secured to the opposing faces of the clamping members, a handle-bar to operate the movable member, and means for engaging said bar to hold the movable member in a position to clamp the article.

3. In a chuck for irregular forms, the combination of a base-plate adapted to be secured in position upon the saddle of a lathe, a stationary clamping member adapted to be vertically adjustably secured in position upon the face of the plate, a block adjustably secured to one side of said member, a movable clamping member pivotally attached at one end to said block, clamping-blocks formed with faces molded to fit the article to be clamped and adjustably and detachably secured to the opposing faces of said clamping members, a pivoted handle-bar for operating the movable member, and a vertically-adjustable catch mounted on the stationary member with which the handle-bar may be engaged to hold the movable member in position to clamp the article.

4. In a chuck for irregular forms, the combination of a base-plate adapted to be secured in position upon a lathe and provided with a head portion, a bracket adjustably secured to said head and provided with a laterally-extending table having a groove in its upper face and forming a stationary clamping member, a block adjustably secured to one side of said table, a movable clamping member provided with a groove in its lower face and having lugs embracing said block and pivotally attached thereto, clamping-blocks formed with faces molded to fit the article to be clamped and provided with ribs on their opposite faces to engage the grooves in the clamping members, and means for holding the movable member in position to clamp the article.

5. In a chuck for irregular forms, the combination of a base-plate adapted to be secured in position upon a lathe, a head on said plate having vertically-extending dovetail grooves, a bracket having a horizontally-extending table formed with a dovetail groove and forming a stationary clamping member, dovetail tongues on said bracket to engage the grooves in the head, an adjusting-screw engaging the bracket, a block adjustably secured to the edge of said bracket, a movable clamping member having a dovetail groove in its lower face and provided with downwardly-extending lugs embracing said block and pivotally secured thereto, clamping-blocks formed with faces molded to fit the article to be clamped, dovetail ribs on said clamping-blocks to engage the grooves in the clamping members, set-screws engaging said blocks to secure the same in the grooves, a handle-bar provided with a handle at one end and pivotally secured at its opposite end to the upper face of the movable clamping member, and a catch-bar secured to the table and provided with a tapering slot extending inward from one side of said bar to receive the handle-bar.

6. In a chuck for irregular forms, the combination of a base-plate adapted to be adjustably secured to the saddle of a lathe, a vertically-extending head on said plate formed with dovetail grooves, a bracket having a horizontally-extending table formed with a dovetail groove in its upper face and forming a stationary clamping member, a vertically-adjustable block secured to one edge of said table, a movable clamping member provided with a dovetail groove in its lower face, lugs on said movable member extending downward therefrom and pivotally secured at their lower ends to said block, clamping-blocks formed with molded faces to fit the article to be clamped and with dovetail tongues to engage the grooves in the clamping members, set-screws extending through the clamping members and engaging the clamping-blocks, a handle-bar pivoted at one end to the upper face of the movable clamping member, a hook on said movable member to engage said bar, a catch-bar secured to the edge of the stationary member by bolts extending through elongated openings therein and formed with a laterally-bent end and a slot extending inward from its edge, and an adjusting-screw extending through the laterally-bent end of said catch-bar and engaging the stationary clamping member.

In testimony whereof I affix my signature in presence of two witnesses.

WALTER L. ABATE.

Witnesses:
   OTTO F. BARTHEL,
   THOMAS G. LONGSTAFF.